United States Patent
Hsu et al.

(10) Patent No.: US 7,963,788 B2
(45) Date of Patent: Jun. 21, 2011

(54) ELECTRICAL CONNECTOR HAVING DATUM BLOCK FACILITATING PRECISE ALIGNMENT

(75) Inventors: Shuo-Hsiu Hsu, Tu-Cheng (TW); Hao-Yun Ma, Tu-Cheng (TW)

(73) Assignee: Hon Hai Precision Ind. Co., Ltd, New Taipei (TW)

( * ) Notice: Subject to any disclaimer, the term of this patent is extended or adjusted under 35 U.S.C. 154(b) by 0 days.

(21) Appl. No.: 12/549,395

(22) Filed: Aug. 28, 2009

(65) Prior Publication Data

US 2010/0055935 A1 Mar. 4, 2010

(30) Foreign Application Priority Data

Sep. 1, 2008 (TW) .................................. 97215674
Sep. 30, 2008 (TW) .................................. 97217525

(51) Int. Cl.
*H01R 13/62* (2006.01)
(52) U.S. Cl. ......................................... 439/331; 439/71
(58) Field of Classification Search .................. 439/331, 439/71
See application file for complete search history.

(56) References Cited

U.S. PATENT DOCUMENTS

| | | | |
|---|---|---|---|
| 6,334,786 B1 * | 1/2002 | Lee | 439/331 |
| 6,368,138 B1 * | 4/2002 | Huang | 439/331 |
| 7,063,552 B2 * | 6/2006 | Matsunaga et al. | 439/326 |
| 7,160,129 B2 * | 1/2007 | Yin | 439/331 |
| 7,270,559 B1 * | 9/2007 | Chen | 439/326 |
| 7,604,486 B2 * | 10/2009 | Martinson et al. | 439/70 |
| 2008/0242138 A1 * | 10/2008 | Chang | 439/331 |

FOREIGN PATENT DOCUMENTS

TW M244598 9/2004

* cited by examiner

*Primary Examiner* — Hien Vu
(74) *Attorney, Agent, or Firm* — Andrew C. Cheng; Wei Te Chung; Ming Chieh Chang (57) ABSTRACT

An electrical connector (100) used to transmit electric and optical signal from a module to a circuit substrate comprises an insulative housing (1), a plurality of contacts (2) received in the insulative housing (1) and a cover (3) being assembled on the insulative housing (1) and can move between an opened position to a closed position, the insulative housing (1) comprises a bottom wall (141) and a plurality of sidewalls (142) extending upwardly from the bottom wall (141), each of the sidewalls (142) each defines a plurality of datum blocks (145) and the inner surface of the datum (145) on one sidewall (142) are located in one plane, the datum blocks (145) together formed a space (14) to receive the module.

9 Claims, 8 Drawing Sheets

ELECTRICAL CONNECTOR HAVING DATUM BLOCK FACILITATING PRECISE ALIGNMENT

BACKGROUND OF THE INVENTION

1. Field of the Invention

The present invention relates to an electrical connector, and more particularly, to an electrical connector having longitudinal sidewalls each has at least a datum block ensuring precise contact interconnection alignment thereof.

2. Description of the Prior Art

TW M 244598 issued to Lu on Sep. 21, 2004 discloses a conventional electrical connector for electrically connecting a module with a PCB. The electrical connector comprises a socket body having a number of terminals received therein and a metallic cover assembled to the socket body. The socket body comprises a bottom wall and two sidewalls extending upwardly from the bottom wall. The bottom wall and the sidewalls form a space for disposing a module therein. The cover defines a slot and the side surface of the side wall defines a pinshaft received in the slot and can move in the slot.

The space is used for accommodating the module. When the insulative housing is formed through the molding process, the longitudinal sidewalls of the insulative housing are vulnerable to vary from straightness because of the plastic material, thereby effecting alignment between terminals therein with respect to the package disposed therein. It is needed to select much more points to determine the datum block for positioning. Furthermore, during application, deformation of the sidewalls will cause the module can not accurately mate with the electrical connector. Accordingly, manufacture precision of the electrical connector is increased.

In view of the above, an improved electrical connector is needed to overcome the above-mentioned disadvantages.

SUMMARY OF THE INVENTION

Accordingly, an object of the present invention is to provide an electrical connector having datum block facilitating precise alignment.

To fulfill the above-mentioned object, an electrical connector used to transmit electric and optical signal from a module to a circuit substrate comprises an insulative housing, a plurality of contacts received in the insulative housing and a cover assembled on the insulative housing, the cover can move between an opened position to a closed position, the insulative housing comprises a bottom wall and a plurality of sidewalls extending upwardly from the bottom wall, the sidewalls defines a plurality of datum blocks and the inner surface of the datum block on the same sidewall are in one plane, the datum blocks together form a space to receive the module.

Other objects, advantages and novel features of the invention will become more apparent from the following detailed description when taken in conjunction with the accompanying drawings.

DETAILED DESCRIPTION OF THE PREFERRED EMBODIMENT OF THE INVENTION

Reference will now be made to the drawings to describe the present invention in detail.

Figure 1:
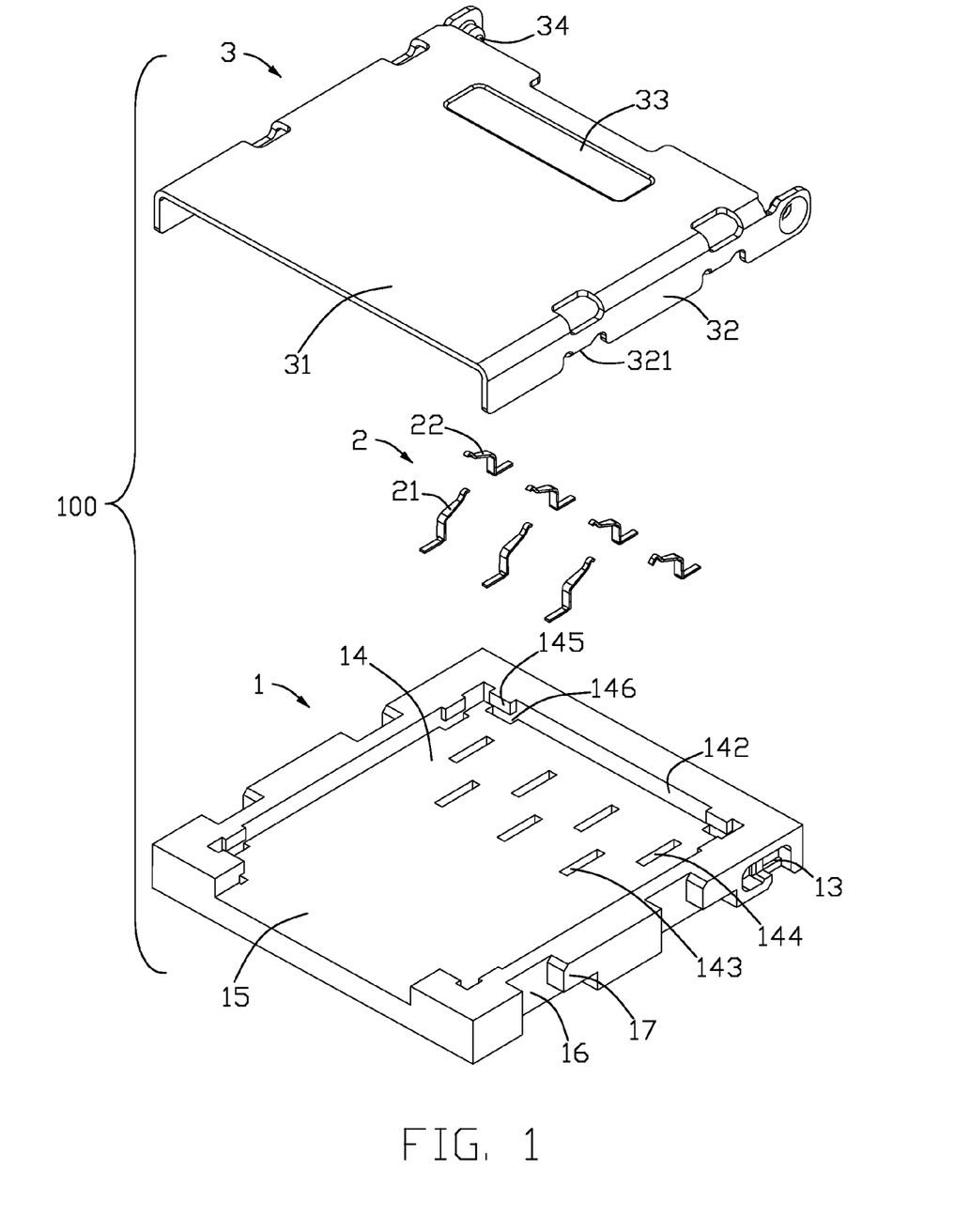
FIG. 1 is an exploded view of an electrical connector in accordance with a preferred embodiment of the present invention.
Figure 2:
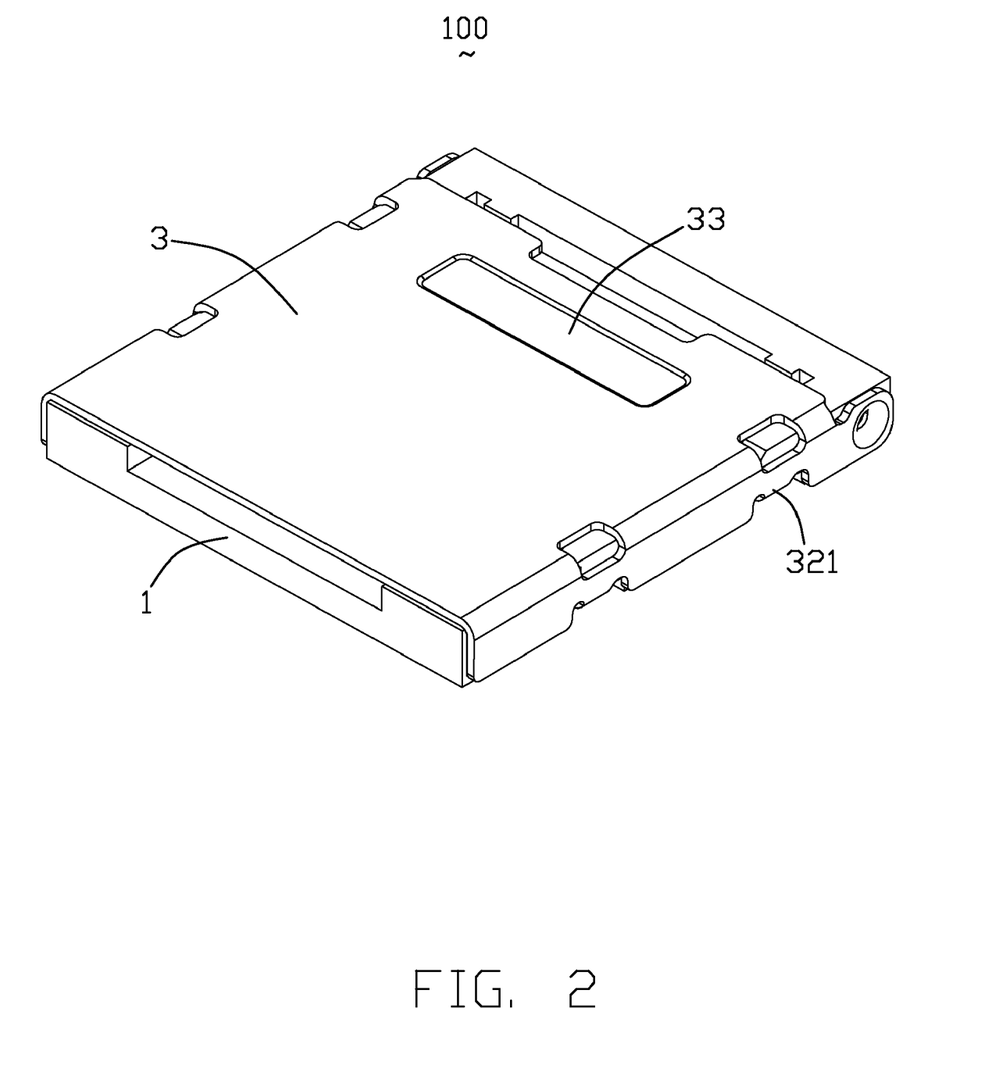
FIG. 2 is an assembled view of the electrical connector shown in FIG. 1, showing the cover is in a closed position.
Figure 3:
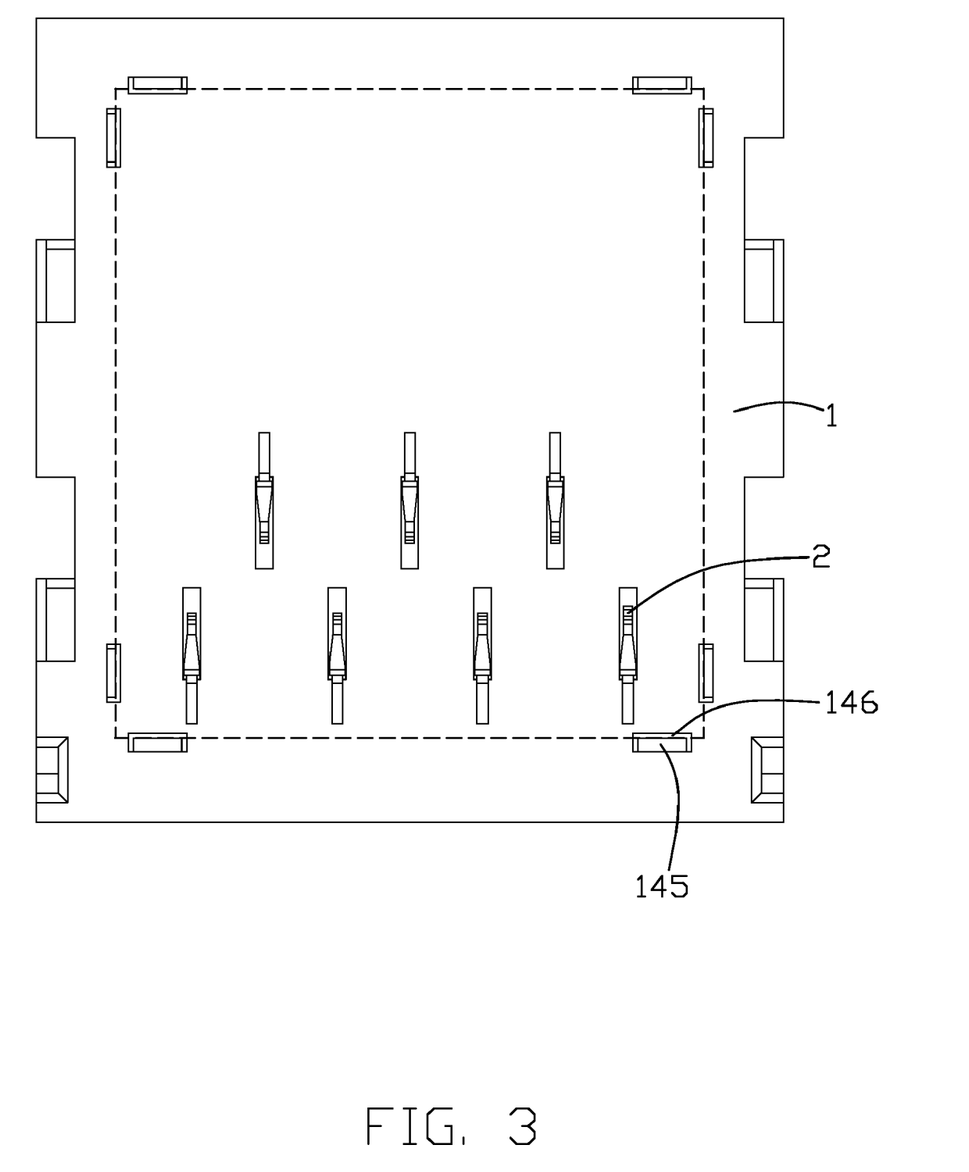
FIG. 3 is a bottom view of the insulative housing shown in FIG. 1.
Figure 4:
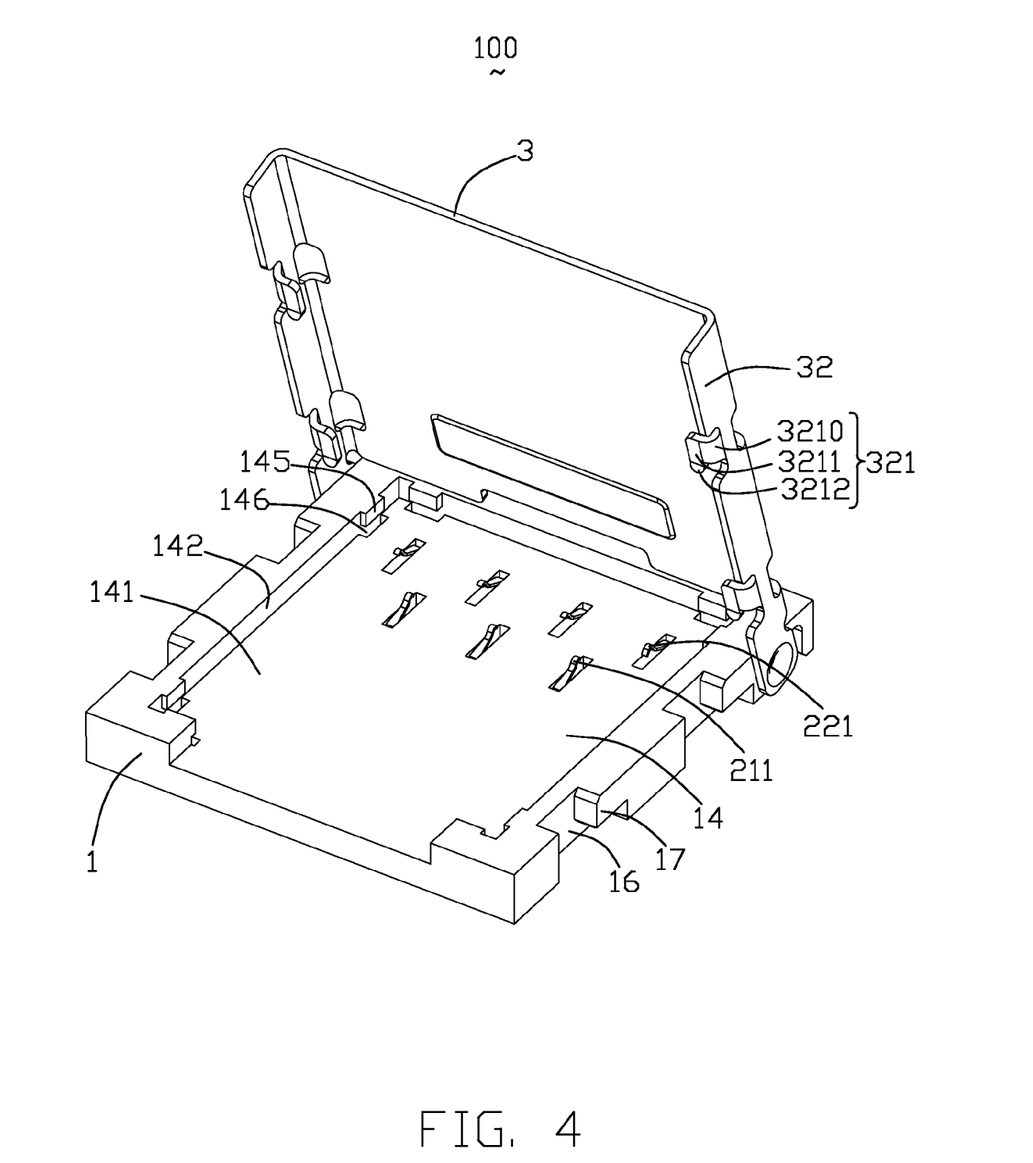
FIG. 4 is similar to FIG. 2, while the cover is in an opened position.

Referring to FIGS. 1-4, an electrical connector 100 in accordance with the present invention is used to convert electric and optical signal from a module (not shown) to a circuit substrate (not shown). The electrical connector 100 comprises an insulative housing 1, a plurality of contacts 2 received in the insulative housing 1 and a cover 3 assembled on the insulative housing 1.

The insulative housing 1 is configured to a rectangular shape and comprises a bottom wall 141, four sidewalls 142 extending upwardly from the bottom wall 141. The bottom wall 141 and the four sidewalls 142 together formed a receiving space. The bottom wall 141 defines a row of first passageways 143 and a row of second passageways 144 parallel to each other. The contacts 2 comprises a plurality of first contacts 21 received in the first passageways 143 and a plurality of second contacts 22 received in the second passageways 144. The first contacts 21 each defines a first engaging portion 211 extending into the receiving space and the second contacts 22 each defines a second engaging portion 221 extending into the receiving space. The first engaging portion 211 and the second engaging portion 221 extend in opposite directions.

Those four sidewalls 142 each has a pair of datum blocks 145 and the bottom wall 141 defines a slot 146 under each of the datum blocks 145. The datum 145 together formed a space 14 to receive the module therebetween. One of the sidewalls 142 defines an opening 15 communicating with the space 14. Two datum blocks 145 are positioned on the two end of the sidewall 142 and are discrete with respect to each other. The inner surface of the datum blocks 145 is located in the same plane. Thus, when the module is assembled into the space 14 of insulative housing 1, the sides of module can engage with inner surface of the datum blocks 145 to make an accurately connection with the contact assembly 2. The slot 146 has a same shape with the datum block 145 and is larger than the datum block 145. One of the sidewalls 142 defines a groove 13 at on end, a recess 16 at the other end and a lock portion 17 near the recess 16.

The cover 3 is made of sheet metal and comprises a flat body plate 31 and two flanges 32 extending downwardly from the body plate 31. The middle of the body plate has an embossment 33 pressing upon the module. The flange 32 defines a column-shaped pinshaft 34 corresponding to the groove 13 and also defines a stop portion 321 corresponding to the lock portion 17. The stop portion 321 comprises a connecting portion 3210 extending downwardly from the flange 32 and an interlock portion 3211 extending curvedly from the connecting portion 3210. The end of the interlock portion 3211 defines a guiding portion 3212 at an end thereof.

When the electrical connector 100 is assembled, the contact assembly 2 and the cover 3 are assembled on the insulative housing 1. The pinshaft 34 is located in the groove 13, so that the cover 3 can move from an opened position to a closed position.

Figure 5:
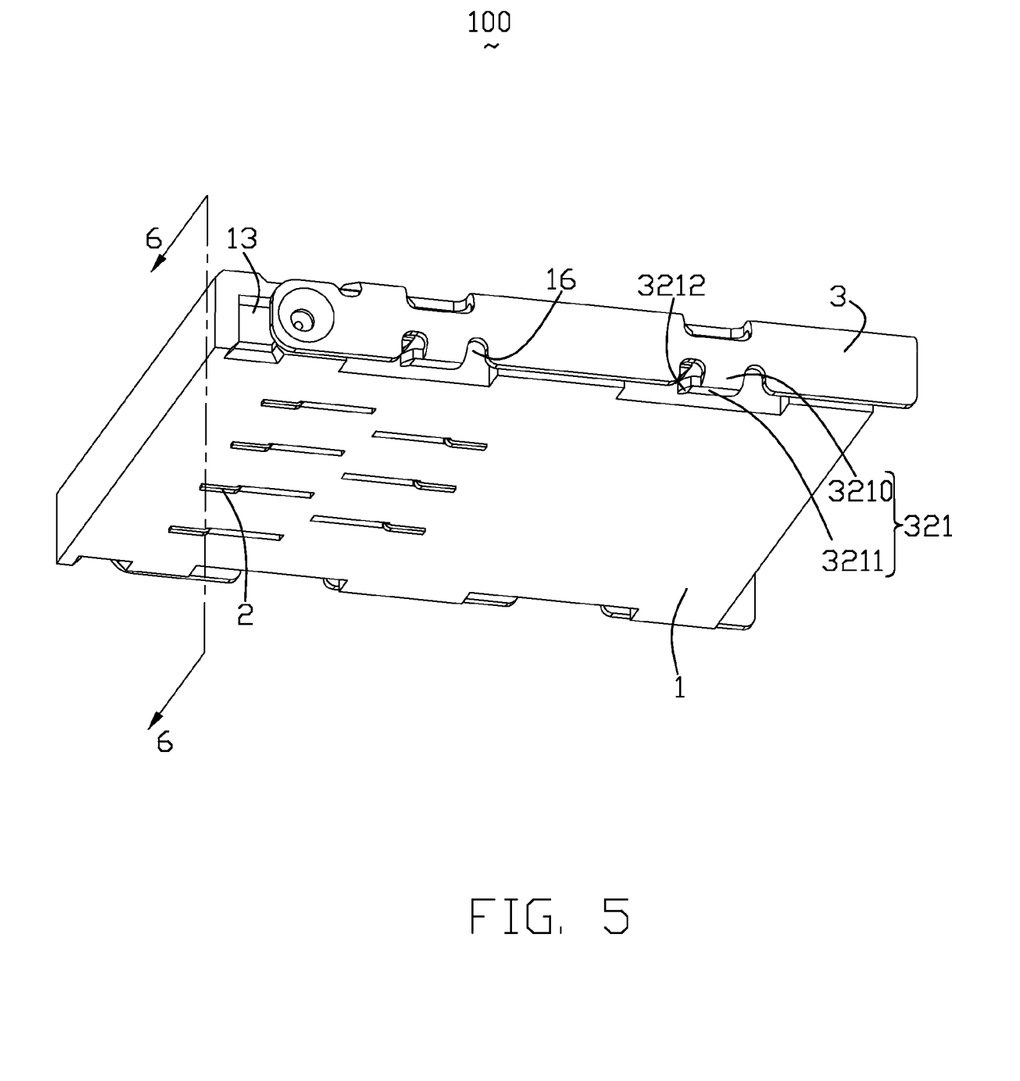
FIG. 5 is similar to FIG. 2, showing the cover has not locked with the insulative housing.
Figure 6:
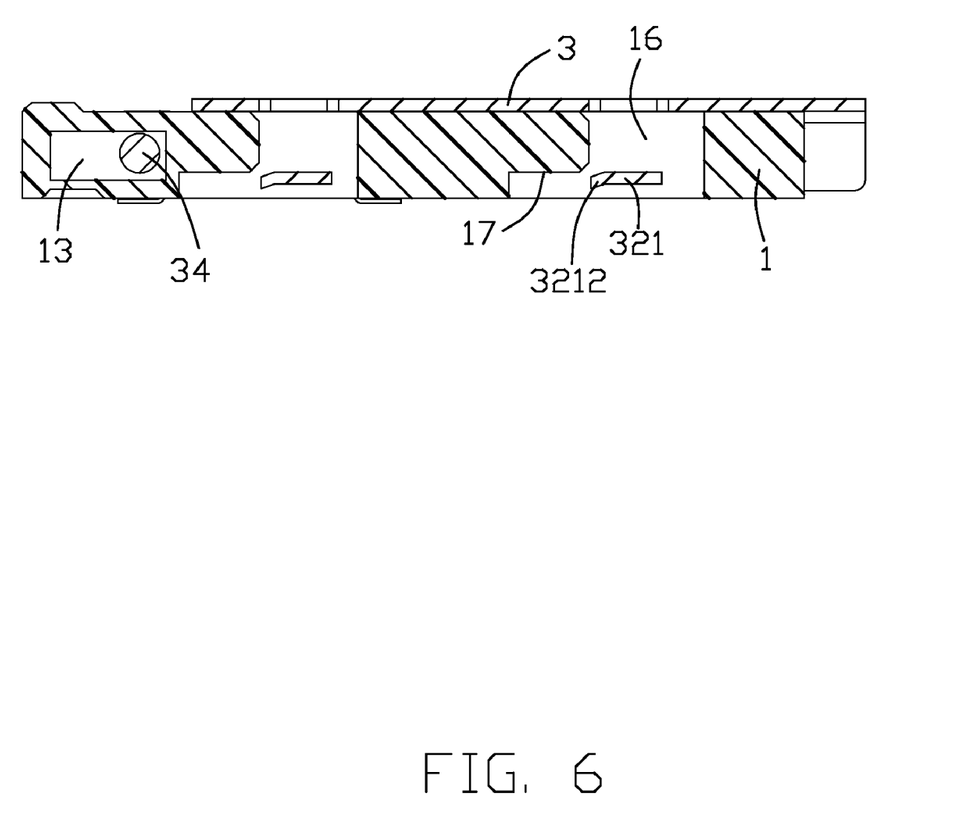
FIG. 6 is a cross-sectional view taken along the line 6-6 of FIG. 5.
Figure 7:
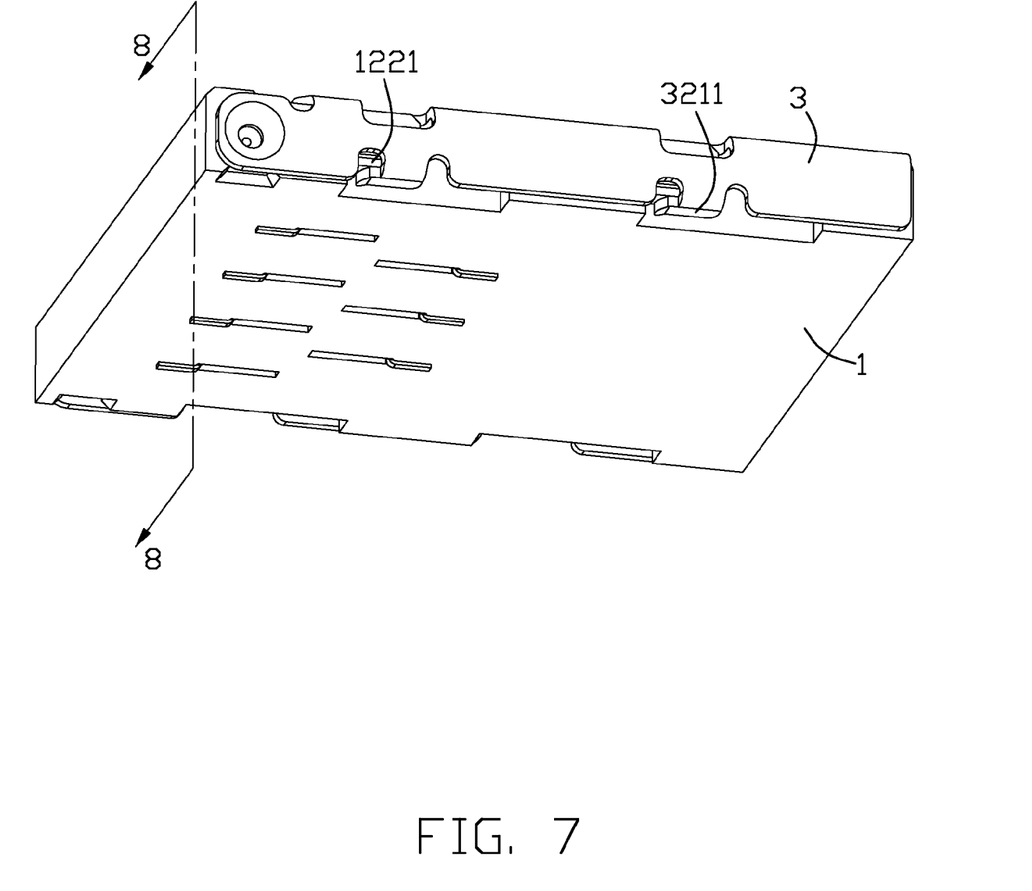
FIG. 7 is similar to FIG. 2, while in another aspect.
Figure 8:
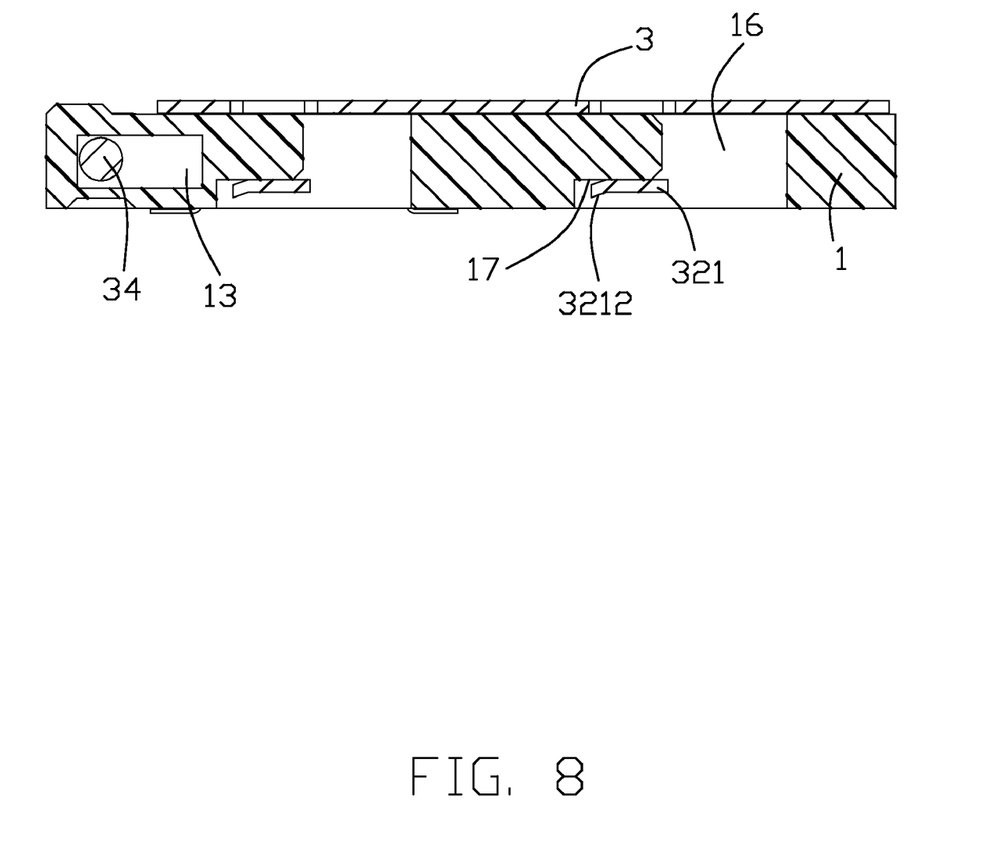
FIG. 8 is a cross-sectional view taken along the line 8-8 of FIG. 7.

Referring to FIGS. 5-8, showing the operation of the electrical connector 100. First, the cover 3 is opened and the module is disposed therein from the upper of the insulative housing 1 to the space 14. In this position, the module is engaged with the inner surface of the datum block 145 to make an accurately connection with the contact assembly 2. When the module is disposed into the electrical connector 100, the cover 3 covers the insulative housing 1 substantially. In this position, the stop portion 321 is located in the recess 16. Then the cover 3 is further pushed to make it to move forwardly and the pinshaft 34 is also moved in the groove 13 until the stop portion 321 is moved to the underside of the lock portion 17 to interlock with the lock portion 17. In this position, the cover 3 is locked on the insulative housing 1. In this process, the guiding portion 3212 can make the stop portion 321 to move to the underside of the lock portion 17 easily.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector used to electrically connect a module to a circuit substrate, comprising:
   an insulative housing comprising a bottom wall, and four sidewalls extending upwardly from the bottom wall, each of the sidewalls defining at least a pair of datum blocks coplanar to each other and inner surfaces of the datum blocks on the same sidewall being in one plane, the datum blocks jointly defining a space to receive the module;
   a plurality of contacts received in the bottom wall of the insulative housing and adjacent to one of the sidewalls, one of the sidewalls in a front housing opposite to one of the sidewalls in a back housing defining an opening corresponding to the contacts; and
   a metal cover being pivotally assembled on the insulative housing and moving between an opened position to a closed position;
   wherein other sidewalls, each defines a groove at one end, and a recess at the other end and a lock portion near the recess;
   wherein the cover comprises a flat body plate and two flanges extending downwardly from the body plate;
   wherein the flange defines a column-shaped pin shaft received in the groove and can move in the groove; and
   wherein the bottom wall comprises a slot impenetrating the bottom wall, the slot is located under the datum block and one can see the inner surface of the datum block from the bottom surface of the bottom wall through the slot.

2. The electrical connector as claimed in claim 1, wherein the flange has a stop portion interlocked with the lock portion to make the cover in the closed position.

3. The electrical connector as claimed in claim 2, wherein the stop portion comprises a connecting portion extending vertically and downwardly from the flange and an interlock portion extending curvedly from the connecting portion.

4. The electrical connector as claimed in claim 3, wherein an end of the interlock portion defines a guiding portion.

5. The electrical connector as claimed in claim 1, wherein a size of the slot is larger than a size of the datum block.

6. The electrical connector as claimed in claim 1, wherein the side wall defining the opening therein, has the corresponding pair of datum blocks laterally communicatively and intimately located by two opposite lateral sides of the opening, respectively.

7. A socket connector, comprising:
   an insulative housing defining a base portion with peripheral walls jointly defining a receiving space therebetween, a plurality of passageways defined adjacent to one of the walls;
   a plurality of contact terminals assembled within the passageways and having a contact engaging portions extending into the receiving space;
   at least two opposite adjacent walls each forming a pair of datum blocks coplanar with each other and extending into the receiving space; and
   a metallic cover pivotally and moveably assembled onto two opposite walls and located between a closed position in which the receiving space is completely closed; and an opening position, in which the receiving space is accessible;
   wherein the two opposite walls define guiding recesses at one end and grooves at the other end respectively for horizontally movement of the cover;
   wherein the cover comprises a flat body plate and two flanges extending downwardly from the body plate;
   wherein the bottom wall comprises a slot impenetrating the bottom wall, the slot is located under the datum block and one can see the inner surface of the datum block from the bottom surface of the bottom wall through the slot;
   wherein an addition wall defining an opening to communicate the an exterior with the receiving space in a front-to-back direction, wherein said addition wall defines a pair of datum blocks laterally communicatively and intimately located by two opposite lateral sides of the opening, respectively.

8. The socket connector as recited in claim 7, wherein interlock arrangement is arranged between the opposite walls and the cover.

9. The socket connector as recited in claim 7, wherein the cover includes an embossment directing toward the contact engaging portions of the contacts.

* * * * *